United States Patent
Hahn et al.

(10) Patent No.: US 6,297,928 B1
(45) Date of Patent: Oct. 2, 2001

(54) MOUNTING ASSEMBLY FOR A DISK DRIVE

(75) Inventors: Peter Hahn; Arthur Lin, both of Fremont; Shin John Choi, Cupertino; Rodney Ngai, Sunnyvale, all of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/203,775

(22) Filed: Dec. 2, 1998

(51) Int. Cl.[7] .................................................. G11B 33/14
(52) U.S. Cl. ........................................ 360/97.01; 361/685
(58) Field of Search ............................... 360/97.01, 97.02, 360/97.03, 137; 361/685, 686, 724, 725; 248/560, 564, 638

(56) References Cited

U.S. PATENT DOCUMENTS

| | | | |
|---|---|---|---|
| 4,713,714 | * 12/1987 | Gatti et al. ........................ | 360/97.01 |
| 5,654,875 | * 8/1997 | Lawson ............................... | 361/685 |
| 5,677,811 | * 10/1997 | Kuno et al. ........................ | 360/97.01 |
| 6,075,695 | * 6/2000 | Konno et al. ...................... | 361/685 |
| 6,097,608 | * 8/2000 | Berberich et al. .................. | 361/752 |
| 6,122,165 | * 9/2000 | Schmitt et al. ..................... | 361/685 |

\* cited by examiner

*Primary Examiner*—David L. Ometz
(74) *Attorney, Agent, or Firm*—Steven G. Roeder; James P. Broder

(57) ABSTRACT

A mounting assembly for securing a disk drive to a frame of a computer is provided herein. The mounting assembly includes three rigid mounts and a single flexible mount. Each rigid mount rigidly secures the drive housing to the frame and prevents degradation of performance of the disk drive. The flexible mount diminishes the level of vibration transferred from the frame to drive housing. Further, the flexible mount facilitates flexing of the drive housing intermediate the flexible mount and the rigid mounts. This reduces the effects of a shock pulse to the disk drive and inhibits head slap between a transducer head and a storage disk.

19 Claims, 4 Drawing Sheets

MOUNTING ASSEMBLY FOR A DISK DRIVE

FIELD OF THE INVENTION

The present invention relates generally to disk drives for storing data. More specifically, the present invention relates to an improved mounting assembly for a disk drive and method for reducing the effects of shock to a disk drive.

BACKGROUND

Disk drives are widely used in computers and data processing systems for storing information in digital form. In conventional Winchester disk drives, a transducer head "flies" upon an air cushion in very close proximity to a storage surface of a rotating data storage disk. The storage surface includes multiple magnetic storage domains that may be recorded and read back by the transducer head. The transducer head is supported near the storage surface using an actuator arm which is moved with an actuator motor.

The air cushion which enables the transducer head to fly in close proximity to the storage surface is created by air flow during rotation of the disk. When the disk rotation ceases, the air cushion dissipates and the transducer head is no longer supported above the storage surface of the disk. Thus, the transducer head "rests" or "lands" on the storage surface during non-rotation of the storage disk.

FIG. 1A illustrates a top plan view of a prior art disk drive 100 mounted to a frame 102 of a computer. FIGS. 1B and 1C illustrate a bottom perspective view of the prior art disk drive 100 during bending caused by a shock transferred to the disk drive 100. The bending illustrated in FIGS. 1B and 1C is exaggerated for clarity. In the prior art embodiment, the disk drive 100 includes a drive housing 104 having a base 106 and four, spaced apart threaded apertures 108. A bolt (not shown) is threaded into each of the threaded apertures 108 to secure the drive housing 100 to the frame 102.

Unfortunately, the threaded apertures 108, pursuant to disk drive industry standards, are asymmetrically located on the drive housing 104. As illustrated in FIGS. 1B and 1C, this unbalanced mounting scheme causes the drive housing 104 to bend and flex along a housing flex line 110 when the frame 102 is subjected to a shock impulse. Stated another way, because all of the threaded apertures 108 are asymmetrically located, a portion of the drive housing 104 cantilevers and flexes on the housing flex line 110 somewhat similar to a diving board.

Referring back to FIG. 1A, a disk assembly 112 is mounted on one side of the flex line 110 while an actuator assembly 114, including actuator arms 116 are attached to the base 106 on the other side of the flex line 110. As a result thereof, flexing of the drive housing 104 causes movement of the actuator assembly 114 relative to the disk assembly 112. Unfortunately, the movement to the actuator assembly 114 is amplified by the long, cantilevering actuator arms 116. This can cause the transducer heads 118 attached to the distal ends of the actuator arms 116 to lift off of the storage disk 120 and subsequently slam or slap back into the storage disk 120. This is commonly referred to as "head slap" in the industry. Head slap can lead to loss of data due to erosion or scarring of the magnetic film on the storage disk 120, debris particles in the disk assembly 112, as well as damage to the transducer heads 118.

One attempt to solve the problem includes isolating the entire disk drive by using four, soft shock absorbing mounts to mount the drive housing to the frame. The soft mounts are effective in protecting the disk drive from shock. Unfortunately, the soft mounts require more physical space than rigid mounts to implement. Further, the performance level of the disk drive is reduced because of the compliant nature of the soft mounts. More specifically, the soft mounts give during movement by the actuator motor and decrease the performance of actuator motor.

Other attempts include resonance tuning of the disk drive and mechanisms to prevent the liftoff of the transducer heads from the storage disks when the disks are not rotating. However, these attempts have proved to not be entirely satisfactory.

In light of the above, it is an object of the present invention to provide a device and method for reducing the effects of shock pulses to a disk drive. Yet another object of the present invention is to provide a mounting assembly for a disk drive which conforms to industry standards and which is relatively easy to manufacture and assemble. Still another object of the present invention is to provide a device or method which minimizes head slap and damage to the storage disk and/or the transducer head.

SUMMARY

The present invention is directed to a mounting assembly for securing a disk drive to a frame of a computer which satisfies these objectives. The disk drive includes a drive housing having a first mounting location and a second mounting location. The mounting assembly including a first rigid mount and a flexible mount. The first rigid mount rigidly secures the second mounting location to the frame. The flexible mount flexibly secures the first mounting location to the frame.

As provided herein, the flexible mount diminishes the level of vibration transferred from the frame to the drive housing at the flexible mount and facilitates flexing of the drive housing intermediate the first mounting location and the second mounting location. More specifically, the flexible mount facilitates flexing of the drive housing along a housing flex line which extends across the drive housing in between the first mounting location and the second mounting location. Flexing along the housing flex line will reduce the amplifying effects of the long actuator arms. Thus, flexing of the drive housing is less likely to cause a transducer head to lift off of a storage disk. This diminishes the effects of a shock to the drive housing, the level and frequency of head slap and the risk of data loss due to erosion or scarring of the storage disk.

The flexible mount flexes in a direction substantially perpendicular to a base of the drive housing and inhibits flexing in a direction substantially parallel the base of the drive housing. This allows the drive housing to move up and down at the first mounting location and not transversely. In one embodiment, the flexible mount is a deflecting clip which secures the first mounting location to the drive housing. The deflecting clip includes a clip guide which interacts with a housing aperture in the drive housing to inhibit the deflecting clip from moving in a direction substantially parallel to a base of the drive housing.

The present invention also includes a method for attaching a disk drive to a frame. The method includes the steps of providing a drive housing including four mounting locations and fixedly securing three of the mounting locations to the frame. Because one of the mounting locations is not rigidly secured to the frame, the drive housing has a housing flex line positioned between the mounting location which is not rigidly secured to the frame and the other mounting locations upon a sufficient shock to the frame.

Importantly, the unique design of the mounting assembly provided herein diminishes the effects of a shock pulse to the disk drive. The three rigid mounts prevent degradation in performance of the disk drive. The one flexible mount dampens the amount of shock pulse transferred from the frame to the drive housing at the flexible mount. Further, the flexible mount alters the housing flex line of the drive housing to minimize the effects of the shock pulse.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
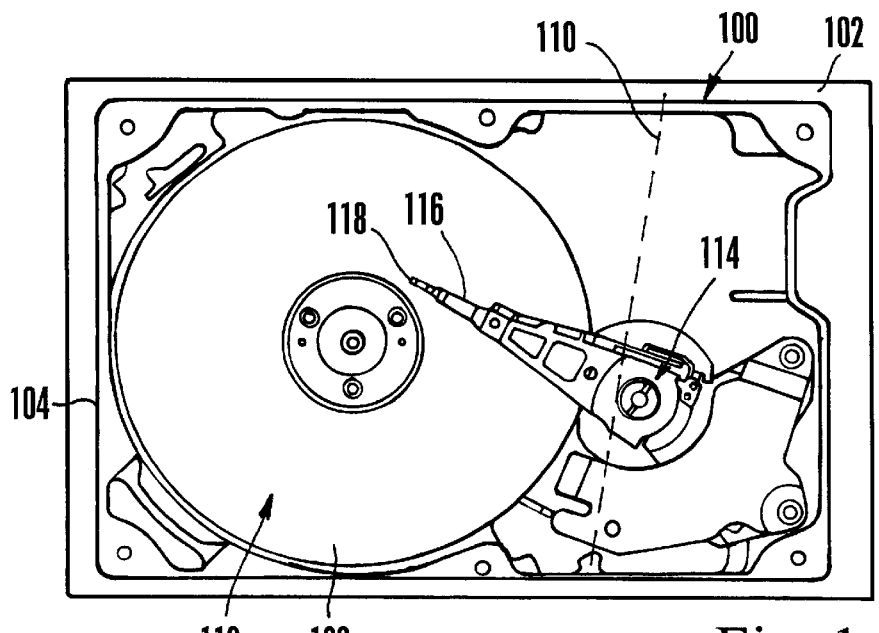
FIG. 1A is a top plan view of a prior art disk drive mounted to a frame.
Figure 1B:
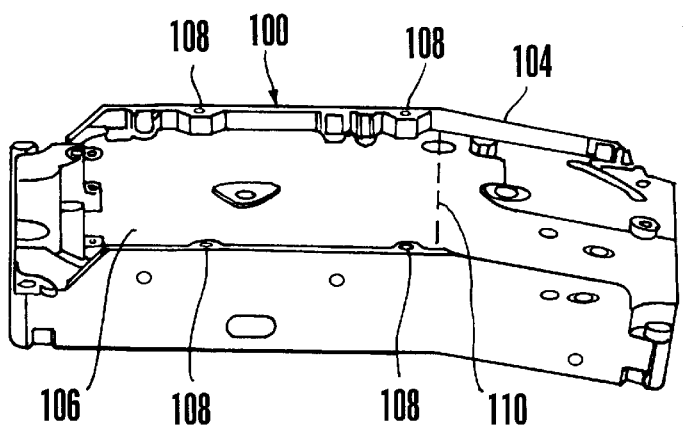
FIG. 1B is a bottom, perspective view of the prior art disk drive of FIG. 1A illustrating the bending of the disk drive.
Figure 1C:
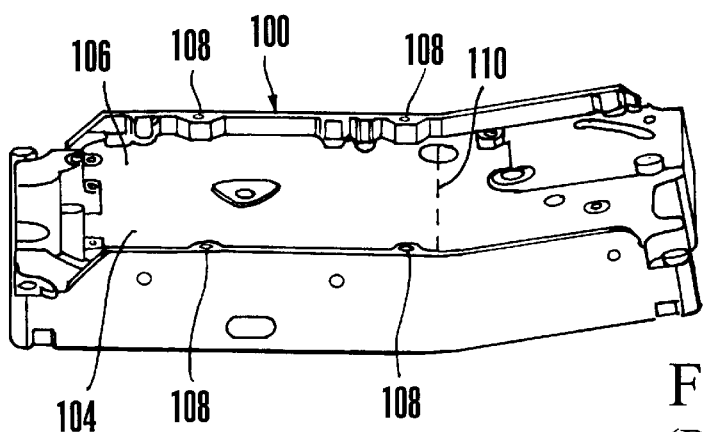
FIG. 1C is a bottom, perspective view of the prior art disk drive of FIG. 1A illustrating the bending of the disk drive.
Figure 2:
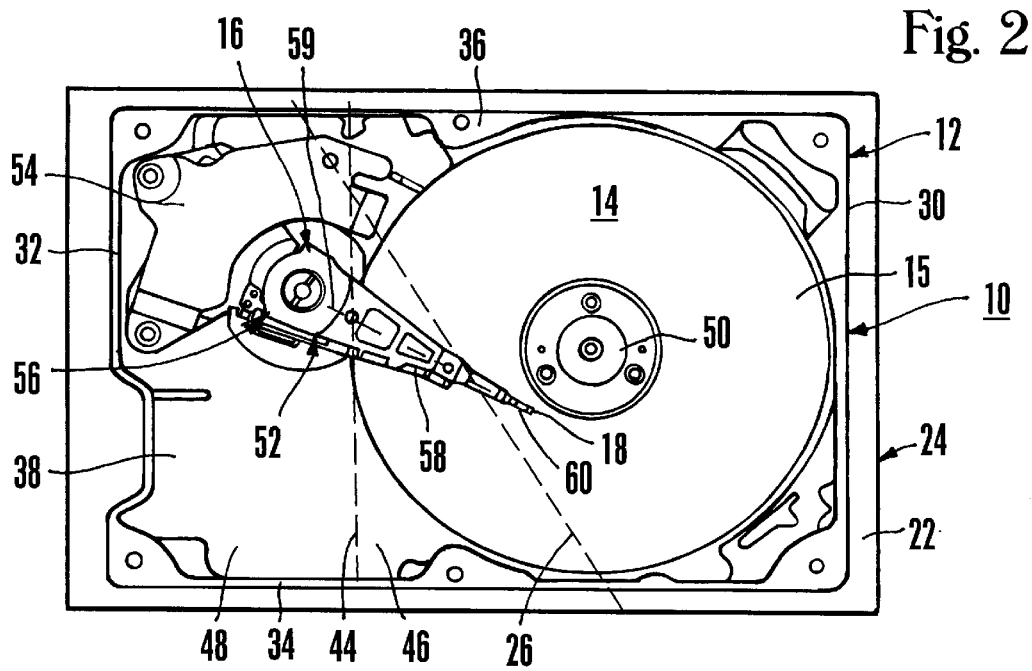
FIG. 2 is a top plan view of a disk drive having features of the present invention mounted to a frame of a computer.
Figure 3:
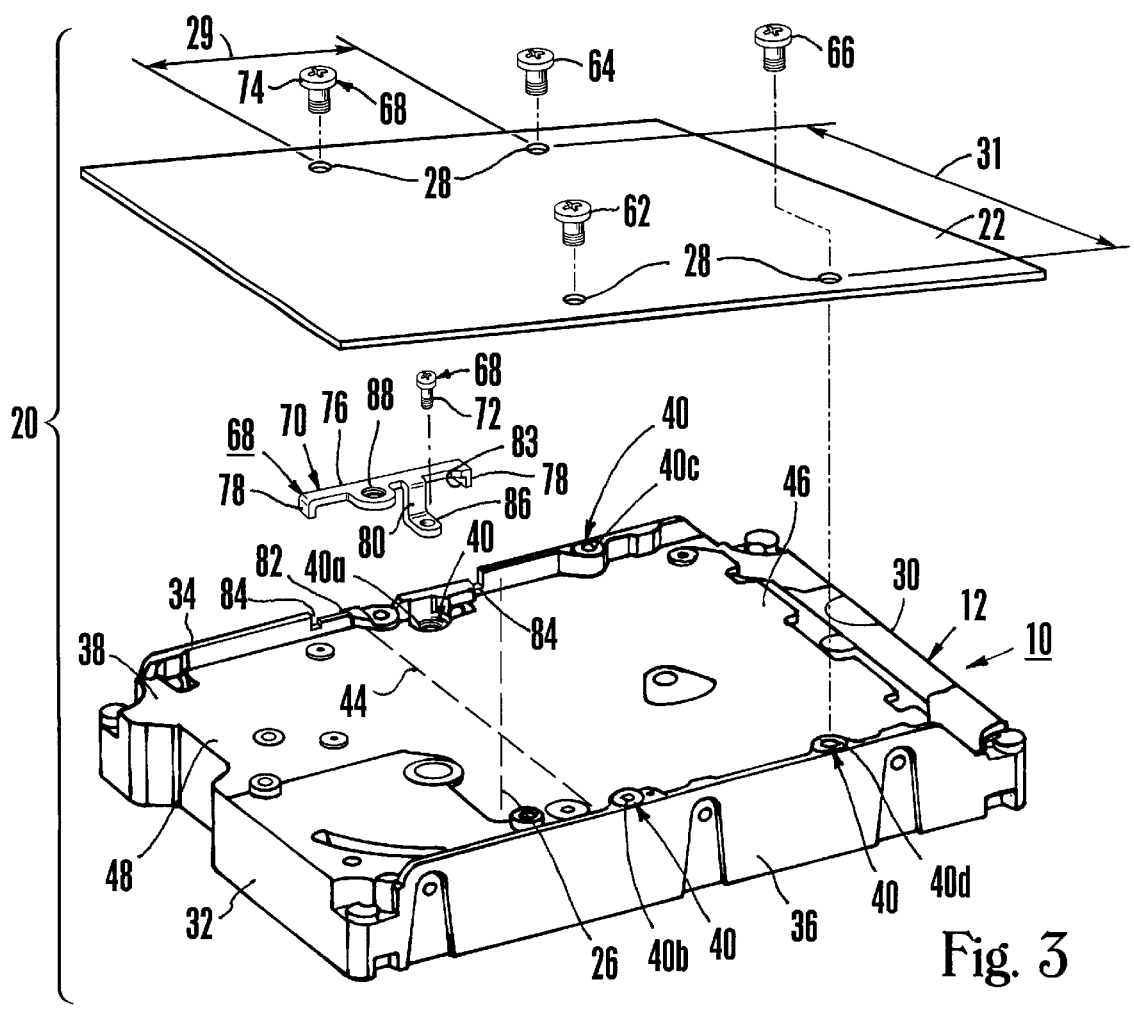
FIG. 3 is a bottom, exploded, perspective, assembly view of the disk drive and a portion of the frame of FIG. 2.

Referring initially to FIGS. 2 and 3, a disk drive 10 according to the present invention includes (i) a drive housing 12, (ii) a disk assembly 14 including one or more storage disks 15, (iii) an actuator assembly 16 for positioning a transducer head 18 proximate each storage disk 15, and (iv) a mounting assembly 20 for securing the disk drive 10 to a frame 22 of a computer 24. As provided herein, the mounting assembly 20 dampens the level of vibration which is transferred to the disk drive 10 from a short duration shock pulse to frame 22. Further, the mounting assembly 20 alters a housing flex line 26 of the drive housing 12 to minimize the effects of the vibration transferred to the drive housing 12. This reduces the potential of damage to the storage disk 15 and/or the transducer head 18.

The frame 22 illustrated in the FIG. 3 includes four spaced apart frame openings 28 for securing the drive housing 12 to the computer 24. In this embodiment, a length distance 29 between adjacent frame openings 28 is approximately 44.45 millimeters and an across distance 31 between adjacent frame openings is approximately 95.25 millimeters pursuant to industry standards. Thus, the mounting assembly 20 can be adapted to be used with an existing disk drive 10. Alternately, the pattern of the frame openings 28 can be varied.

A detailed description of the various components of a disk drive 10 is provided in U.S. Pat. No. 5,319,511, issued to Lin, and assigned to Quantum Corporation, the assignee of the present invention. The contents of U.S. Pat. No. 5,319,511 are incorporated herein by reference. Accordingly, only the structural aspects of a disk drive 10 which are particularly significant to the present invention are provided herein.

The drive housing 12 retains the various components of the disk drive 10. The drive housing 12, illustrated in Figures, is rectangular shaped and includes first and second, spaced apart, parallel end walls 30, 32, first and second spaced apart, parallel side walls 34, 36, a base 38 and a cover (not shown). The base 38 and cover are maintained apart by the walls 30, 32, 34, 36. The walls 30, 32, 34, 36 and the base 38 are typically formed as an integral unit for structural integrity.

Figure 4:
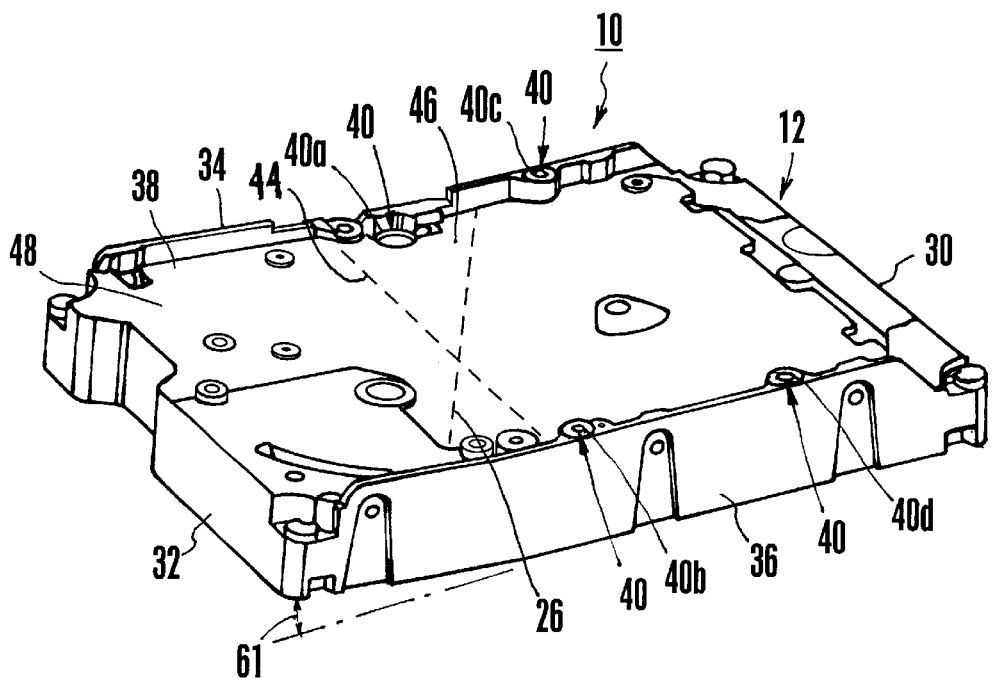
FIG. 4 is a bottom, perspective view illustrating flexing of the drive housing along the housing flex line.

The drive housing 12 illustrated in FIGS. 3 and 4 includes four spaced apart mounting locations 40 near the base 38 for interacting with the mounting assembly 20 and securing the bottom of the drive housing 12 to the frame 22. These mounting locations 40 are designated a first mounting location 40a, a second mounting location 40b, a third mounting location 40c and a fourth mounting location 40d for convenience of discussion. The first mounting location 40a is positioned near the first side wall 34 intermediate the end walls 30, 32. The second mounting location 40b is positioned near the second side wall 36 intermediate the end walls 30, 32. The third mounting location 40c is positioned near the first side wall 34 and the first end wall 30. The fourth mounting location 40d is positioned near the second side wall 36 and the first end wall 30. In the embodiment illustrated in the Figures, each mounting location 40 includes an internally threaded aperture which is adapted to receive a portion of the mounting assembly 20.

Referring to FIGS. 3 and 4, the mounting locations 40 in this embodiment are asymmetrically positioned on the drive housing 12. A transition line 44 is illustrated in the FIGS. 3 and 4, to illustrate a division of the drive housing 12 into a first section 46 and a second section 48 which are substantially side-by-side. The transition line 44 extends between the side walls 34 and 36 between the first and second mounting locations 40a and 40b and the second end wall 32. The first section 46 includes the four spaced apart mounting locations 40 for securing the drive housing 12 to the frame 22. The second section 48 has no mounting locations and cantilevers relative to the first section 46.

The disk assembly 14 includes one or more spaced apart storage disks 15 which are secured to a spindle hub 50. The spindle hub 50 rotates relative to a spindle shaft (not shown) which is secured to the base 38 in the first section 46. A spindle motor (not shown) rotates the spindle hub 50 and the storage disks 15 at a constant angular velocity. The rotation rate of the storage disks 12 varies according to the design of the disk drive 10.

Each storage disk 15 stores data in a form that can be subsequently retrieved if necessary. Magnetic storage disks 15 are commonly used to store data in digital form. For conservation of space, each storage disk preferably includes a data storage surface on each side of the storage disk 15. The storage disks 15 are manufactured by ways known to those skilled in the art.

The design of the actuator assembly 16 depends upon the design of the disk drive 10. In the embodiment illustrated in FIG. 2, the actuator assembly 16 includes an E block 52 and an actuator motor 54. The E block 52 is defined by an actuator hub 56 and one or more actuator arms 58 which cantilever away from the actuator hub 56. Each actuator arm 58 includes a longitudinal axis 59. The actuator hub 56 rotates on an actuator shaft (not shown) which is secured to the base 38 in the second section 48. The actuator shaft is secured to the base 38 near the first and second mounting locations 40a, 40b. Further, the actuator shaft is secured to the base 38 closer to the second mounting location 40b than the first mounting location 40a.

The actuator arms 58 rotate with the actuator hub 56 and position the transducer heads 18 near the storage surfaces of the storage disks 15. The number and spacing of the actuator arms 58 varies according to the number and spacing of the disks 15. For example, a disk drive 10 which includes five disks would require six actuator arms 58.

A load beam 60 is used to attach each transducer head 18 to a distal end of one of the actuator arms 58. Each load beam 60 is flexible in a direction perpendicular to the storage disk 15 and acts as a spring for supporting a transducer head 18. As the disks 15 rotate, air flow between the transducer head 18 and storage disk 15 causes the transducer head 18 to ride at an aerodynamically stabilized distance from the storage disk 15. Each load beam 60 is resilient and biased to urge each transducer head 18 towards the storage disk 15.

The single transducer head 18 interacts with a single storage surface on one of the storage disks 15 to access or transfer information to the storage disk 15. For a magnetic storage disk 15, the transducer head 18 is commonly referred to as a read/write head. It is anticipated that the present device can be utilized for data transducers other than read/write heads for a magnetic storage disk.

The actuator motor 54 precisely moves the actuator hub 56, actuator arms 58 and the transducer heads 18 relative to the storage disks 15 to retrieve information from the storage disk 15. In the embodiment shown in the Figures, the actuator motor 54 is a rotary voice coil actuator. Alternately, for example, the actuator motor 54 could be a linear induction motor which moves radially with respect to the disks 15.

Preferably, the disk drive 10 includes an actuator latch (not shown) which inhibits rotation of the actuator hub 56 and retains the transducer head 18 in a landing zone of the storage disk 15 during non-rotation of the storage disk 15. This reduces the potential of damage to the storage disk 15 when the transducer head 18 is not flying on an air bearing generated by the rotation of the disk 15.

As provided herein, the mounting assembly 20 secures the drive housing 12 to the frame 22 and facilitates flexing of the drive housing 12 between the first mounting location 40a and the other mounting locations 40b–c. Stated another way, the mounting assembly 20 facilitates flexing of the drive housing 12 along the housing flex line 26 which extends across the drive housing 12 from the first side wall 34 to the second side wall 36 in between the first mounting location 40a and the second mounting location 40b. The flexing 61 of the drive housing 12 illustrated in FIG. 4 is exaggerated for clarity.

As a result of the unique mounting assembly 20, the housing flex line 26 is not parallel or on with the transition line 44. Further, as illustrated in FIG. 2, the housing flex line 26 extends under the storage disks 15, across the first section 46, and approaches parallel with the longitudinal axis 59 of the actuator arms 58. Thus, flexing of the drive housing 12 tends to result in movement of the actuator arms 58 around the longitudinal axis 59. This minimizes the amplifying effect of the cantilevering actuator arms 58 and minimizes movement of the transducer head 18 relative to the storage disk 15 during flexing of the drive housing 12.

The mounting assembly 20 includes a first substantially rigid mount 62, a second substantially rigid mount 64, a third substantially rigid mount 66, and a substantially flexible mount 68. Each mount 62, 64, 66, 68 secures one of the mounting locations 40 to the frame 22.

The first rigid mount 62 rigidly secures the second mounting location 40b, the second rigid mount 64 secures the third mounting location 40c and the third rigid mount 66 secures the fourth mounting location 40d to the frame 22. In the embodiment illustrated in the FIG. 3, each rigid mount 62, 64, 66 is a bolt which includes an externally threaded surface. The bolt extends through the frame openings 28 and threads into one of the mounting locations 40. The rigid mounts 62, 64, 66 solidly attach the drive housing 12 to the frame 22 to inhibit degradation in the performance of the actuator motor 54.

The flexible mount 68 is adapted to flexibly secure the first mounting location 40a to the frame 22. The flexible mount 68 diminishes the level of vibration transferred from the frame 22 at the flexible mount 68 to drive housing 12 and facilitates flexing of the drive housing 12 intermediate the first mounting location 40a and the second mounting location 40b. Because the flexible mount 68 is secured to the first mounting location 40a, the housing flex line 26 is closer to parallel with the longitudinal axis 59 of the actuator arms 58 to minimize the amplifying effects of the actuator arms 58 during flexing.

The flexible mount 68 preferably flexes in a direction substantially perpendicular to the base 38 of the drive housing 12 and inhibits flexing in a direction substantially parallel the base 38 of the drive housing 12. In the embodiment illustrated in FIG. 3, the flexible mount 68 includes a deflecting clip 70, a first clip bolt 72 and a second clip bolt 74 for attaching the first mounting location 40a to the frame 22.

The design of the deflecting clip 70 can be varied to suit the design of the disk drive 10. In the embodiment illustrated in FIG. 3, the deflecting clip 70 includes a clip body 76, a pair of spaced apart clip guides 78 and a clip lip 80. The clip body 76 fits into a housing notch 82 in the first side wall 34. The clip guides 78 extend away from the clip body 76. One of the clip guides 78 includes a clip tab 83 which extends away from the clip guide 78 and fits into a housing aperture 84 in the first side wall 34 to inhibit the deflecting clip 70 from moving in a direction substantially parallel to the base 38 of the drive housing 12. The clip lip 80 includes a lip aperture 86 which receives the first clip bolt 72 to attach the deflecting clip 70 to the first mounting location 40a. The clip body 76 also includes a clip mounting location 88 having an internally threaded aperture which receives the second clip bolt 74 to attach the deflecting clip 70 to the frame 22.

Figure 5:
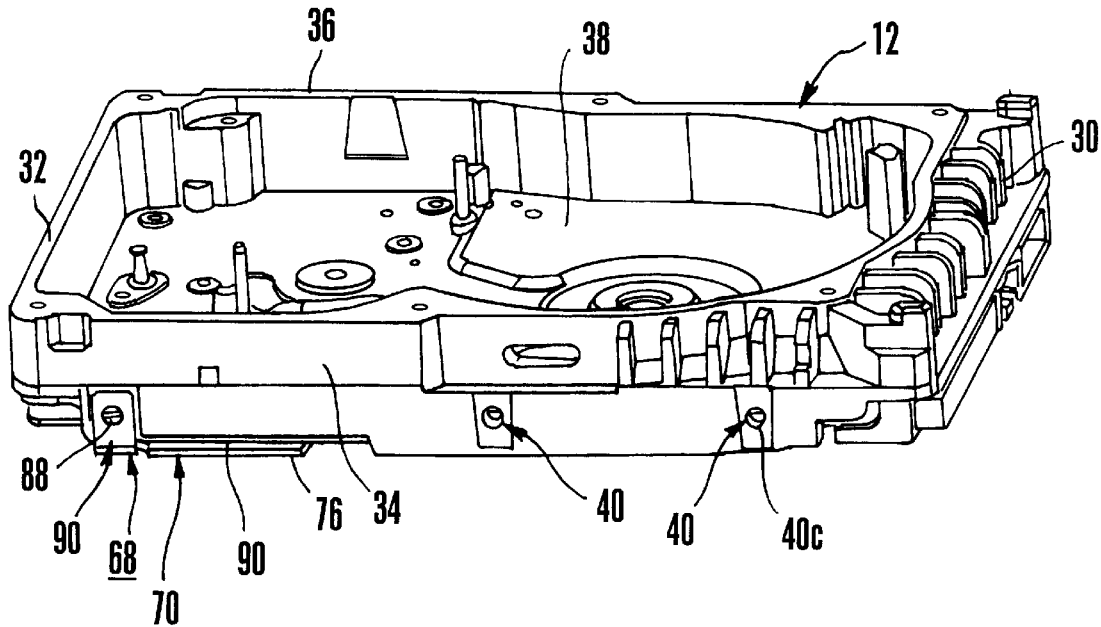
FIG. 5 is a top, perspective view of another embodiment of a drive housing.
Figure 6:
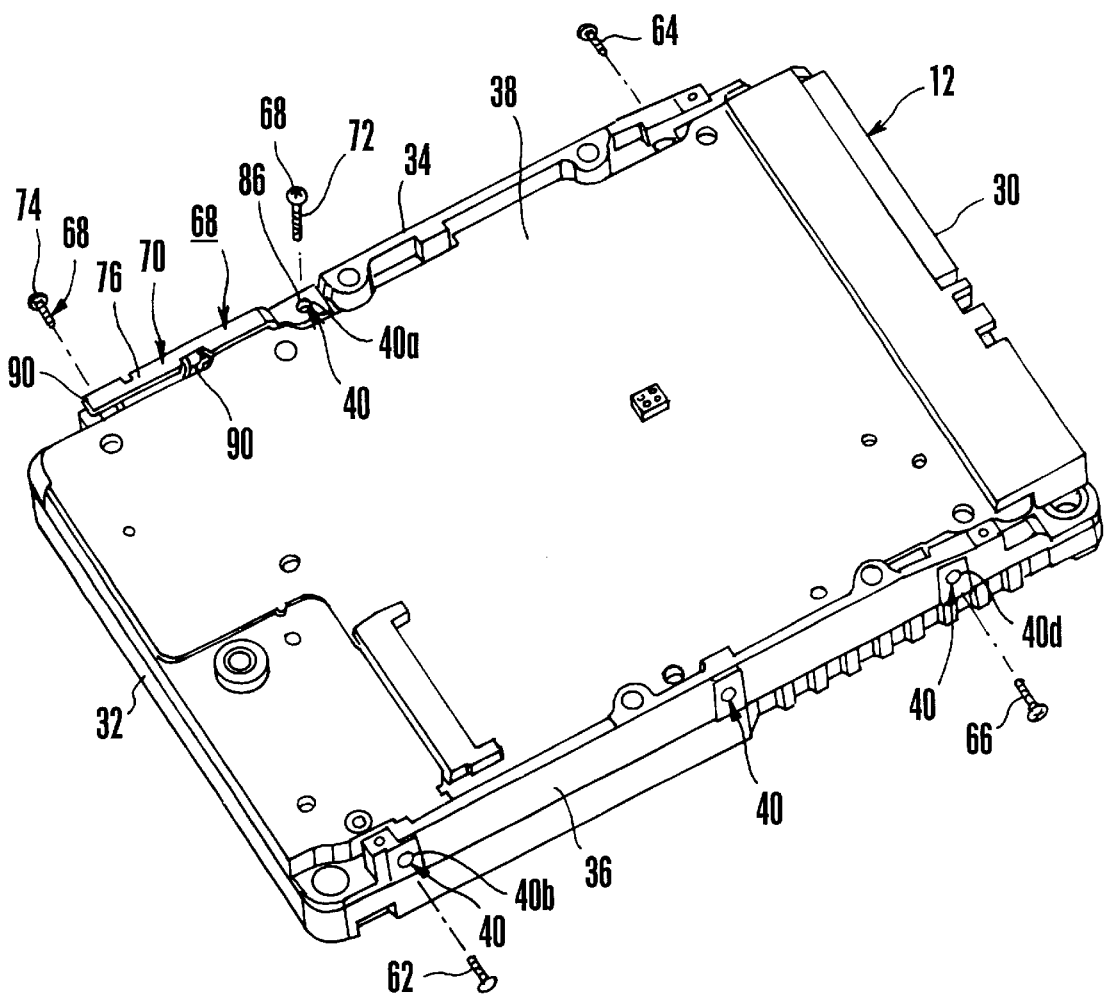
FIG. 6 is a bottom, perspective view of the drive housing of FIG. 5.

FIGS. 5 and 6 illustrate another embodiment of a drive housing 12 in which the sides of the disk drive 10 are secured to the frame (not shown in FIGS. 5 and 6). In this embodiment the drive housing 12 includes three mounting locations 40 on each of the side walls 34, 36 of the drive housing 12. Typically, the center mounting locations 40 on each side wall 34, 36 is not used for attaching the disk drive 10 to the frame. The remaining four mounting locations 40 are designated 40a–40d similar to embodiment illustrated in FIGS. 3 and 4.

In the embodiment illustrated in FIGS. 5 and 6, each mounting location 40 includes an internally threaded aperture for receiving the flexible mount 68 or one of the rigid mounts 62, 64, 66. In the embodiment illustrated in FIGS. 5 and 6, each of the rigid mounts 62, 64, 66 is a bolt which engages one of the mounting locations 40. Additionally, the flexible mount 68 includes the deflecting clip 70, the first clip bolt 72, and the second clip bolt 74 for attaching the first mounting location 40a to the frame.

In the embodiment illustrated in FIGS. 5 and 6, the deflecting clip 70 includes the clip body 76 and a pair of spaced apart clip protruding lips 90 which interact with the first side wall 34. The protruding lips 90 maintain stability of the deflecting clip 70 in a direction substantially parallel to the base 38 while allowing for flexibility substantially perpendicular to the base 38. One of the protruding lips 90 includes the clip mounting location 88 having an internally threaded aperture which receives the second clip bolt 74 to attach the deflecting clip 70 to the frame. The clip body 76 includes the lip aperture 86 which receives the first clip bolt 72 to attach the deflecting clip 70 to the first mounting location 40a.

The distance between the mounting locations 40 can be varied. For example, in the embodiment illustrated in FIGS. 5 and 6, the distance between the second mounting location 40b and the fourth mounting location 40d is approximately 101.6 millimeters and the distance between the third mounting location 40c and the fourth mounting location 40d is approximately 101.6 millimeters pursuant to industry standards.

Importantly, the present invention overcomes the problems associated with prior art mounting assemblies because the rigid mounts 62, 64, 66 prevent degradation of actuator motor performance while the flexible mount 68 diminishes the level of vibration transferred to the disk housing 12 at the flexible mount 68. Further, the mounting assembly 16 alters the housing flex line 26 to minimize the effects of the cantilevering actuator arms 58. This minimizes the level and amount of head slap to protect the storage disk 15 and the transducer head 18.

While the particular disk drive 10, as herein shown and disclosed in detail, is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A mounting assembly for attaching a disk drive to a frame, the disk drive including a drive housing having a first mounting location and a second mounting location, the mounting assembly comprising:
   a first rigid mount adapted to rigidly secure the second mounting location to the frame; and
   a flexible mount adapted to flexibly secure the first mounting location to the frame, the flexible mount diminishing the level of vibration transferred from the frame to the drive housing and facilitating flexing of the drive housing intermediate the first mounting location and the second mounting location.

2. The mounting assembly of claim 1 wherein the flexible mount flexes in a direction substantially perpendicular to a base of the drive housing and inhibits flexing in a direction substantially parallel to the base of the drive housing.

3. The mounting assembly of claim 1 wherein the flexible mount includes a deflecting clip for attaching the first mounting location to the drive housing.

4. The mounting assembly of claim 3 wherein the deflecting clip includes a clip guide which interacts with a housing aperture in the drive housing to inhibit the deflecting clip from moving in a direction substantially parallel to a base of the drive housing.

5. The mounting assembly of claim 1 including a second rigid mount and a third rigid mount for securing the drive housing to the frame.

6. A disk drive comprising (i) a drive housing including the first mounting location and the second mounting location and (ii) the mounting assembly of claim 1 for securing the drive housing to the frame.

7. The disk drive of claim 6 wherein the mounting assembly facilitates flexing of the drive housing along a housing flex line which extends across the drive housing in between the first mounting location and the second mounting location.

8. The disk drive of claim 7 including a storage disk secured to the drive housing and the housing flex line extends under a portion of the storage disk.

9. A computer including the frame and the disk drive of claim 6 secured to the frame with the mounting assembly.

10. A disk drive which is adapted to be secured to a frame, the disk drive comprising:
    a drive housing including a first mounting location, a second mounting location, a third mounting location and a fourth mounting location which are spaced apart;
    an actuator assembly including an actuator shaft which is secured to the drive housing, wherein the actuator shaft is positioned near the first mounting location and the second mounting location; and
    a mounting assembly securing the drive housing to the frame, the mounting assembly facilitating flexing of the drive housing along a flex line that includes a point positioned directly between the first mounting location and the second mounting location.

11. The disk drive of claim 10 wherein the mounting assembly facilitates flexing of the drive housing along the flex line which extends across the drive housing in between the first mounting location and the second mounting location.

12. A method for attaching a disk drive to a frame, the method comprising the steps of:
    providing a drive housing for the disk drive, the drive housing including a first mounting location, a second mounting location, a third mounting location and a fourth mounting location which are spaced apart; and
    fixedly securing the second, third and fourth mounting locations to the frame so that the drive housing flexes along a housing flex line that includes a point positioned directly between the first mounting location and the second mounting location upon a sufficient shock to the frame.

13. The method of claim 12 including the step of flexibly securing the first mounting location to the frame.

14. A disk drive which is adapted to be secured to a frame, the disk drive comprising:
    a drive housing including a first mounting location, a second mounting location, a third mounting location and a fourth mounting location which are spaced apart;
    an actuator assembly including an actuator shaft which is secured to the drive housing, wherein the actuator shaft is positioned near the first mounting location and the second mounting location; and
    a mounting assembly securing the drive housing to the frame, the mounting assembly including a first rigid mount adapted to rigidly secure the second mounting location to the frame and a flexible mount adapted to flexibly secure the first mounting location to the frame, the flexible mount diminishing the level of vibration transferred from the frame to the drive housing and facilitating flexing of the drive housing intermediate the first mounting location and the second mounting location.

15. The disk drive of claim 14 wherein the flexible mount flexes in a direction substantially perpendicular to a base of the drive housing and inhibits flexing in a direction substantially parallel to the base of the drive housing.

16. The disk drive of claim 14 wherein the flexible mount includes a deflecting clip for attaching the first mounting location to the drive housing.

17. The disk drive of claim 14 including a second rigid mount and a third rigid mount for rigidly securing the third mounting location and the fourth mounting location to the frame.

18. A computer including the frame and the disk drive of claim 14 secured to the frame with the mounting assembly.

19. A method for attaching a disk drive to a frame, the method comprising the steps of:

provatsing a drive housing for the disk drive, the drive housing including a first mounting location, a second mounting location, a third mounting location and a fourth mounting location which are spaced apart, the drive housing including a base;

fixedly securing the second, third and fourth mounting locations to the frame so that the drive housing flexes along a housing flex line which is positioned between the first mounting location and the other mounting locations upon a sufficient shock to the frame; and flexibly securing the first mounting location to the frame with a flexible mount which flexes in a direction substantially perpendicular to the base of the drive housing and inhibits flexing in a direction substantially parallel to the base of the drive housing.

* * * * *